Jan. 12, 1932.  G. E. HOLTON  1,840,671
PISTON AND CONNECTING ROD TESTING AND ALIGNING MACHINE
Original Filed June 14, 1926  2 Sheets-Sheet 1

INVENTOR.
GEORGE E. HOLTON
BY
Parker & Burton
ATTORNEYS.

Jan. 12, 1932.  G. E. HOLTON  1,840,671
PISTON AND CONNECTING ROD TESTING AND ALIGNING MACHINE
Original Filed June 14, 1926  2 Sheets-Sheet 2
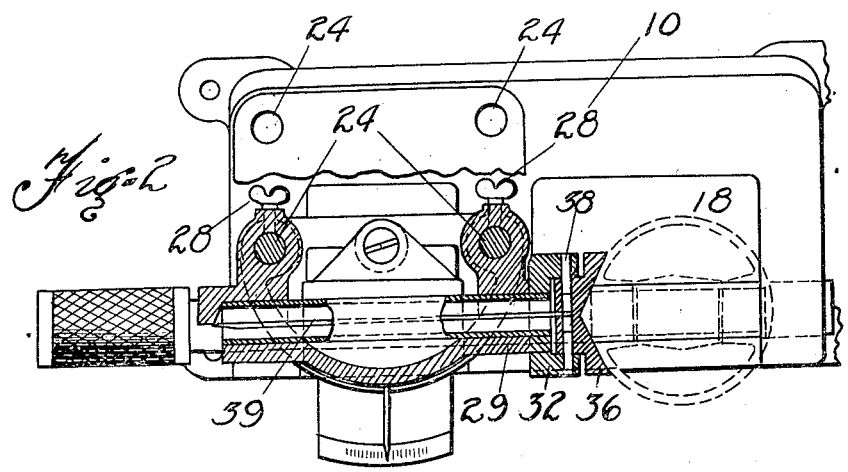
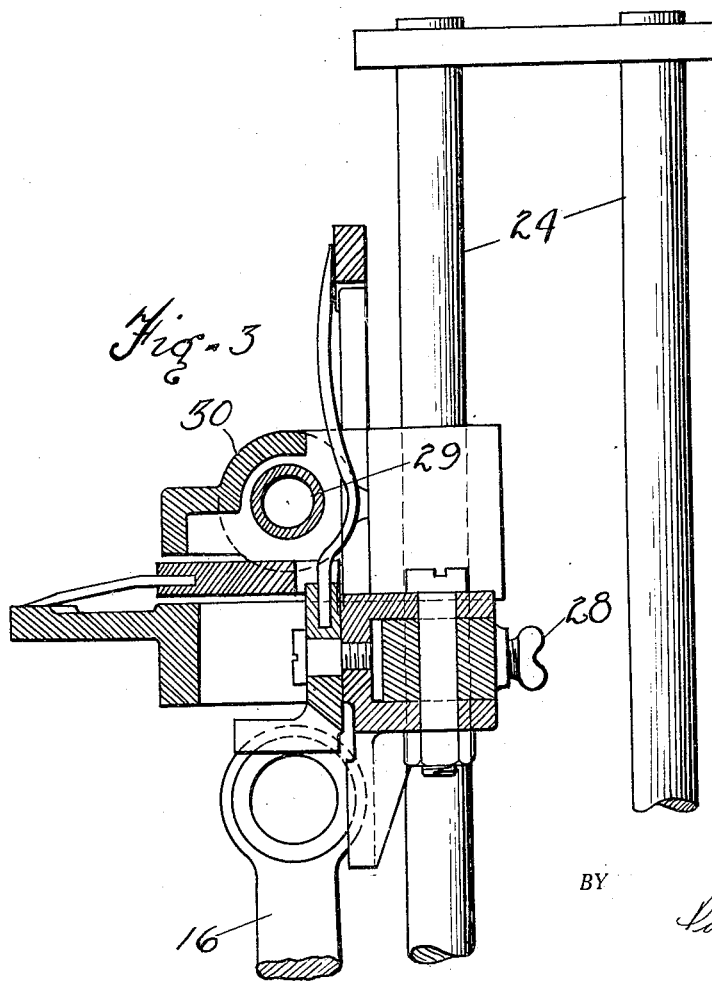
INVENTOR.
GEORGE E. HOLTON
BY
Parker & Burton
ATTORNEYS.

Patented Jan. 12, 1932

1,840,671

UNITED STATES PATENT OFFICE

GEORGE E. HOLTON, OF JACKSON, MICHIGAN, ASSIGNOR TO HINCKLEY-MYERS COMPANY, OF JACKSON, MICHIGAN, A CORPORATION OF MICHIGAN

PISTON AND CONNECTING ROD TESTING AND ALIGNING MACHINE

Original application filed June 14, 1926, Serial No. 115,854. Divided and this application filed March 21, 1927. Serial No. 176,840.

My invention relates to improvements in machines for testing the alignment of a connecting rod provided with a piston and for testing the accuracy of the mounting of the piston upon the rod. This application is a division of Patent No. 1,684,321 issued Sept. 11, 1928.

The object is to provide, in a machine adapted to be employed to test the alignment of connecting rod bearings, mechanism adapted to cooperate with a piston mounted on the rod to test the accuracy of its mounting and register the same to indicate any deviation thereof from an accurate mounting. My improved apparatus is constructed to engage a piston to register its alignment and is likewise adaptable to accommodate to angular positions of the piston upon its mounting on the connecting rod and at the same time register any angular displacement of the piston from an accurate mounting. Other meritorious features and advantages of construction of my machine will appear from the following description of the illustrative embodiment shown in the accompanying drawings and defined in the claims.

In the drawings:

Fig. 2 is a cross sectional view partly in elevation taken on line 2—2 of Fig. 1.

Fig. 3 is a cross sectional view partly in elevation taken on line 3—3 of Fig. 1.

Figure 1:
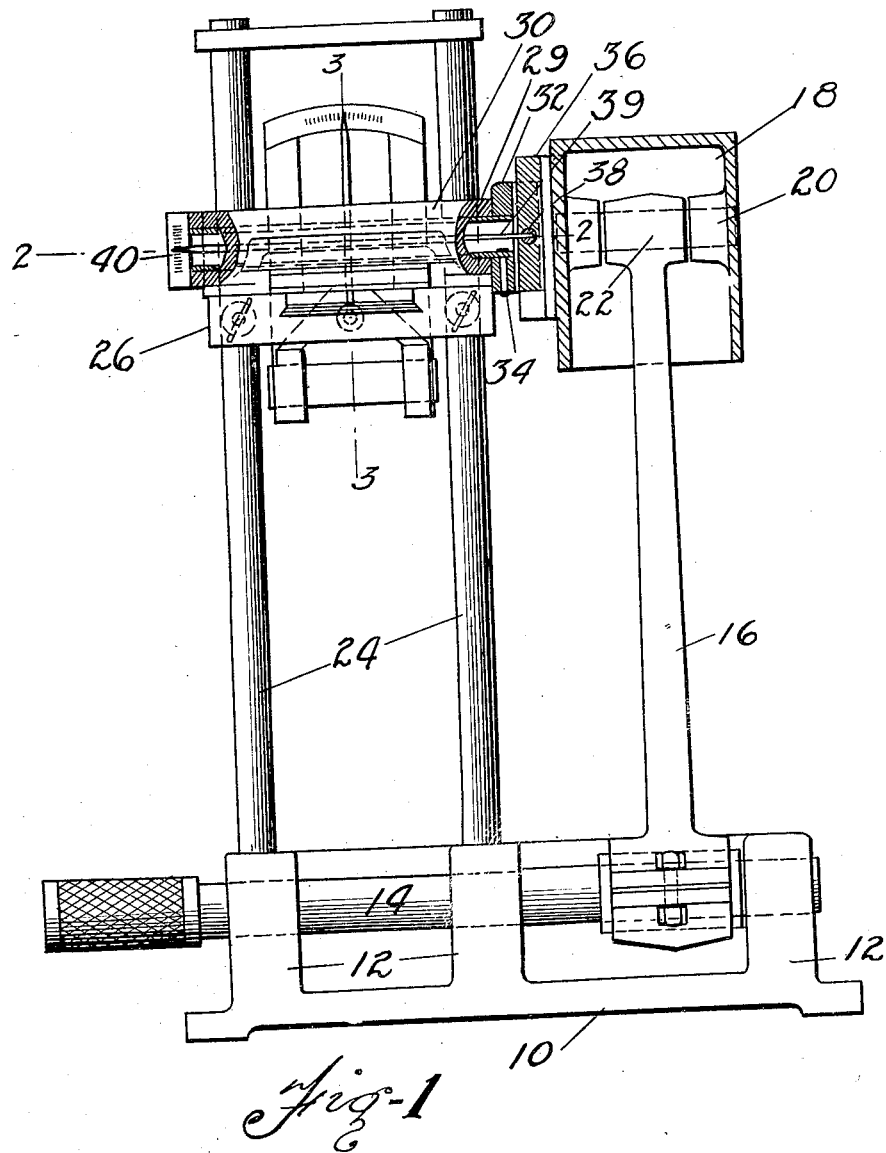
Fig. 1 is a side elevation of my improved machine.

I provide a base 10 which is suitable to be placed on a work bench or fastened in a position where it is desired to use the machine. This base is provided with a plurality of spaced apart aligned bearings 12 which are capable of receiving a removable mandrel 14 upon which the crankshaft bearing of a connecting rod 16 may be removably mounted. The opposite end of the connecting rod is provided with a piston 18 and supported upon a piston pin 20 which is fitted within the piston pin bearing 22 of the rod. In Fig. 1 the connecting rod is shown as mounted upon the mandrel and provided with a piston as set forth.

The base carries a plurality of upright guides or standards 24, four being here shown. These standards are arranged normal to the horizontal plane of the mandrel 14. A head indicated in assembly as 26 is slidably mounted upon the standards for adjustment toward or away from the mandrel and adjusting screws 28 are provided whereby the head may be positioned at different positions of adjustment with respect to the mandrel. The head carries a plurality of indicating devices more particularly described in the parent application hereinabove referred to and in addition carries an indicating device which forms the basis of the present application and which includes a tubular shaft 29 rotatably supported within a cap 30 is shown in Figs. 1 and 3 parallel to the axis of the mandrel. A support 32 is secured to one end of this shaft in a suitable manner as by a pin 34 as shown in Fig. 1 and there is pivotally mounted upon this support a contact plate 36. This contact plate is pivoted upon a pin 38 so that the plate may be swiveled thereabout within a plane normal to the axis of the pin. The contact plate is preferably grooved as shown in Fig. 2 to more closely embrace the periphery of the piston 18. The angular deflection of the contact plate is measured by a pointer 39 which extends through the tubular shaft 29 and the opposite end of which travels over a dial 40 located at the opposite end of such tubular shaft 29.

In testing the alignment of a piston, the connecting rod is mounted upon the mandrel as indicated in the drawings. The head is adjusted to the proper height and the contact plate 36 engages the periphery of the piston. This contact plate is deflected with respect to a line normal to the axis of the mandrel to completely engage the piston and this deflection is measured on the dial 40 by the pointer 39. The contact plate 36, due to its being supported upon the tubular shaft 29, may swivel with such shaft to conform with the piston as it is swiveled upon its mounting on the connecting rod so that the accuracy of the mounting of the piston upon the connecting rod may be taken with the piston located at different angular positions upon said rod.

What I claim is:

1. A connecting rod testing and aligning machine having a base, a mandrel supported horizontally thereon, a guide on the base arranged normally with rsepect to the horizontal plane of the mandrel, a head slidably mounted upon the guide for adjustment toward and away from the mandrel, an indicating device including a contact plate, a reading scale and a pointer journalled as a unit upon the head to turn about an axis parallel to the axis of the mandrel, said contact plate and pointer being pivoted upon an axis to turn within a plane of said first axis.

2. A piston and connecting rod testing and aligning machine having: a base, a mandrel mounted horizontally upon the base, a guide on the base normal to the horizontal plane of the mandrel, a head slidably mounted upon said guide for adjustment toward or away from said mandrel, an indicating device pivotally carried by the head and including a contact plate supported for free angular turning movement about an axis parallel to the axis of the mandrel and for free angular turning movement within a plane of said axis and means connected therewith for indicating the second named angular deflection.

3. A piston and connecting rod testing and aligning machine having: a base, a mandrel mounted thereon, a guide standard on said base, a head slidably mounted upon said standard for adjustment toward or away from said mandrel, a tubular shaft journalled upon said head parallel to the axis of the mandrel, a contact plate pivoted upon one end of the shaft to swivel angularly within a plane of the axis thereof, and a registering member extending through said tubular shaft and coupled with said plate to be actuated thereby to register the deviation thereof from a line normal to the axis of the mandrel.

4. A piston and connecting rod testing and aligning machine having: a base, a mandrel arranged horizontally thereon and adapted to receive the crankshaft bearing of a connecting rod the opposite end of which carries a piston, a guide standard on the base, a head slidably mounted on said standard for adjustment toward or away from said mandrel, an indicating device having a tubular shaft rotatably supported upon said head about an axis parallel to the axis of the mandrel, said indicating device having a contact part pivotally mounted upon said tubular shaft at one end thereof, a registering member connected with said part to be actuated thereby to register the deviation thereof, said registering member extending through said tubular shaft, and a dial on the opposite end of said shaft over which said registering memebr is adapted to travel.

5. A piston and connecting rod testing and aligning machine having: a base, a mandrel horizontally mounted thereon, a pair of vertical guides on the base, a head slidably supported between said guides for adjustment toward or away from said mandrel, an indicator rotatably supported upon said head about an axis parallel to the axis of the mandrel, said indicator being provided with a contact plate pivotally supported at one side of said guides for angular adjustment about an axis in a plane normal to the axis of the mandrel, and a registering member connected with said contact plate to register the angular adjustment thereof.

6. A piston and connecting rod testing and aligning machine including a base having a horizontal mandrel, a pair of vertical guides, a head mounted upon said guides for adjustable movement thereover toward or away from said mandrel, an indicating device journalled upon said head on an axis parallel to the axis of the mandrel for turning movement at all times thereabout, said indicating device including a pivotally mounted contact plate and means carried by said plate for registering angular deflection thereof.

In testimony whereof, I, GEORGE E. HOLTON, sign this specification.

GEORGE E. HOLTON.